UNITED STATES PATENT OFFICE.

EDWARD POLLARD, OF EAST CAMBRIDGE, MASSACHUSETTS.

ORNAMENTING GLASSWARE.

SPECIFICATION forming part of Letters Patent No. 343,608, dated June 15, 1886.

Application filed June 6, 1883. Serial No. 97,297. (No specimens.)

*To all whom it may concern:*

Be it known that I, EDWARD POLLARD, of East Cambridge, in the county of Middlesex and State of Massachusetts, have invented a new and useful Improvement in Ornamenting Glassware; and I do hereby declare that the following is a full, clear, and exact description of the same.

My invention relates to the ornamenting of glassware; and it consists of an improved ornamented ware and of an improved process for producing such ware.

Heretofore the ornamentation of glass in an imitation of etching has been attempted by mixing suitable alkalies with linseed-oil, or by dissolving such alkalies in water and applying the mixture or solution to the glass, which is then subjected to heat to cause the alkali to react upon the glass, cutting its surface. It has also been proposed to apply fluorine in combination with other substances by sprinkling it in finely-powdered condition upon any suitable vehicle previously applied to the surface of the glass, the fluorine being caused to act upon the glass by exposure to an atmosphere of hot vaporized sulphuric acid. It has also been proposed to print upon the face of glass by means of ordinary type and adhesive ink, and then sprinkle on a flux which is to be fixed by heating. My aim is to provide a method whereby this process can be certainly and economically carried out.

My invention consists in first applying ink or size to the glass by means of a rubber or other suitable flexible pad, then adding the flux or other material which is to be caused to adhere to the glass, and finally in heating the article, all as hereinafter set forth.

The printing is accomplished by means of a rubber plate having a pad about it to hold the glass surface properly to the figured surface of the plate. On one side a suitable guide is placed to guide the glass. This is especially necessary when circular or cylindrical vessels—such as tumblers, goblets, and the like—are to be ornamented; or the ink or other vehicle may be printed upon a sheet or pad of suitable material and then transferred to the glass. After the design is thus printed upon the glass, and while it is yet fresh and undried, finely-comminuted enamel, mineral colors, or metal is dusted on. This enamel is such as that ordinarily used by glass-stainers and enamelers. The enamel adheres upon the glass only where the ink or size has been placed. The glass article is then placed in an oven and gradually heated until the enamel is fused to the glass or caused to adhere thereto. This completes the process.

In using gold or silver instead of the enamel or metallic oxides I may place the leaf directly upon the glass after the figure has been printed thereon. The leaf not held by the ink or size may be readily removed, and the gold or silver leaf fixed to the glass by heating in the manner described above. For the gold leaf it is necessary to brush on a solution of borax as a flux before heating. Instead of dusting on the enamel, it may be mixed with the ink or size and applied thereto; but I prefer the method first described.

Manifestly the gold and silver may be applied in the form of dust, like the enamel heretofore described. When the enamel, metallic oxide, or metal is thus fused upon the surfaces of the glass, it is an addition to the glass and in relief, and gives a clear, sharp, white figure, and may be distinguished by these features from any of the etchings in which the surface of the glass is cut and removed. This fusing or application upon the surface renders glass ornamented by my process stronger, since no part of the glass is dimmed. The fused enamel or oxide is also more opaque and gives a better-defined figure, which is not dimmed by wetting.

I am aware that it is not new to impress or place upon glass an adhesive substance and then to dust over said adhesive substance a powdered flux and to fuse the same to the glass; and I am also aware that it is not new to print upon glass with flexible type, using an adhesive material—such as boiled linseed-oil—to dust coloring material thereupon, and to dry the article thus ornamented; and I do not broadly claim this general manner of ornamenting glass. My object is to produce upon glass a close imitation of etching adapted to the finest kind of work, and to certainly and perfectly transfer to the glass any design which may be required.

I claim as my invention—

The improvement in the art of ornamenting glass, consisting in the use of a flexible rubber plate containing the figure or design, in applying thereto ink or suitable size, in transferring the design to the glass to be ornamented by applying the article to the figured surface, then dusting on the printed surface of the glass a suitable flux or coating, and finally subjecting the article to heat, substantially as described.

In testimony whereof I have signed my name to this specification in the presence of two subscribing witnesses.

EDWARD POLLARD.

Witnesses:
F. L. MIDDLETON,
W. C. DUVALL.